United States Patent [19]

Curry et al.

[11] 4,283,777

[45] Aug. 11, 1981

[54] OPTICAL MEMORY HAVING A PARALLEL READ OUT

[75] Inventors: Donald J. Curry, Los Altos; Gordon R. Knight, Cupertino; Daniel C. Kowalski, Portola Valley, all of Calif.

[73] Assignee: Xerox Corporation, Stamford, Conn.

[21] Appl. No.: 39,092

[22] Filed: May 14, 1979

[51] Int. Cl.$^3$ .................................................. G11C 13/04
[52] U.S. Cl. ...................................... 369/32; 365/120; 365/215; 365/234; 369/47; 369/109
[58] Field of Search ............... 365/120, 127, 215, 234; 358/128; 179/100.1 G, 100.3 G, 100.3 V

[56] References Cited

U.S. PATENT DOCUMENTS

| | | | |
|---|---|---|---|
| 3,423,524 | 1/1969 | Bradford | 358/128 |
| 3,438,050 | 4/1969 | Aschenbrenner et al. | 365/234 |
| 3,573,471 | 4/1971 | Kolb | 365/127 |
| 3,582,183 | 6/1971 | Schmidt | 365/120 |
| 3,744,039 | 7/1973 | Hibek et al. | 365/120 |
| 4,094,013 | 6/1978 | Hill et al. | 365/215 |
| 4,104,489 | 8/1978 | Satoh et al. | 358/128 |

*Primary Examiner*—Stuart N. Hecker

[57] ABSTRACT

The output beam of a read laser for an optical memory is diffracted to provide a plurality of read beams of substantially equal intensity for simultaneously scanning all of the data tracks of a selected data channel with a different one of the read beams, whereby each of the read beams is optically modulated in accordance with the data recorded on a respective one of the data tracks. The optically modulated read beams are applied to respective detectors, whereby the data recorded on the different data tracks is simultaneously converted into corresponding video electrical signals. Those signals are, in turn, output selectively or in parallel.

8 Claims, 13 Drawing Figures

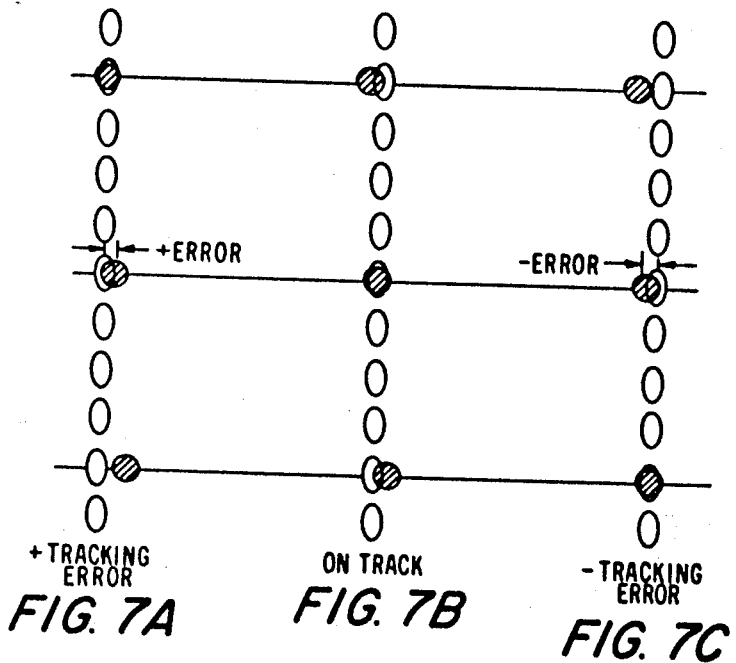
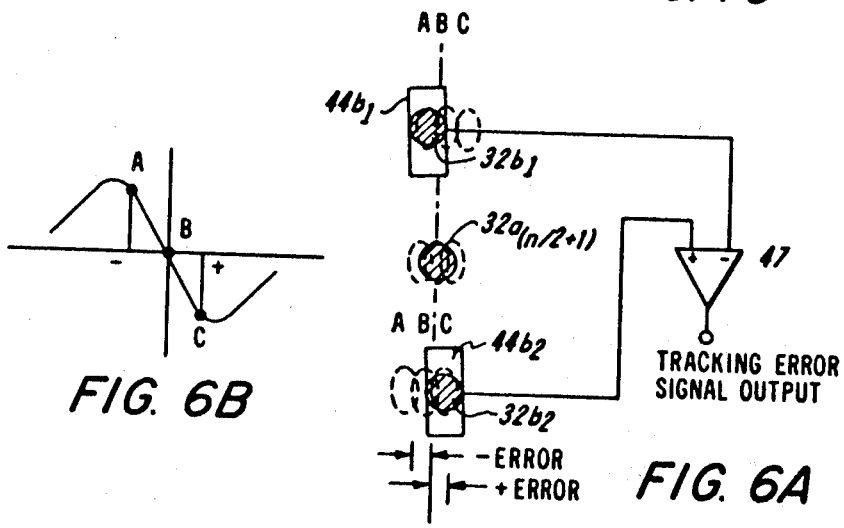
FIG. 7A +TRACKING ERROR
FIG. 7B ON TRACK
FIG. 7C −TRACKING ERROR
FIG. 6B
FIG. 6A

OPTICAL MEMORY HAVING A PARALLEL READ OUT

BACKGROUND OF THE INVENTION

This invention relates to optical memories having a plurality of data tracks per data channel and, more particularly, to methods and means for reading out such data tracks selectively or in parallel.

Digital optical disks are now being seriously considered as potential alternatives to magnetic tape and disk memories. It has been found that optical disks offer a substantially greater data storage capacity than commercially available magnetic tape or disk memories of similar size. See, for example, Kenney et al., "An Optical Disk Replaces 25 Map Taps", *IEEE Spectrum*, February 1979., p. 33.

As is known, a digital optical disk may be configured to have one or more bands of tracks. A continuous, spirally configured track band format is well suited for applications involving long continuous runs of digital data, while a format providing a plurality of concentric track bands may sometimes be better for applications requiring random access to selected memory locations. Regardless, however, of the format selected, there typically are several data tracks per band.

Heretofore, the conventional practice has been to selectively read out the data tracks of an optical memory one track at a time. That is sufficient for many purposes, but imposes a potentially troublesome limitation on the output bandwidth of such a memory.

SUMMARY OF THE INVENTION

Accordingly, in accordance with this invention, an optical memory is read out by simultaneously illuminating all of the tracks of a preselected track band so that the data recorded on those tracks is converted into corresponding video signals in parallel on a track-by-track basis. To that end, in one embodiment of the invention, the output beam of a read laser for an optical memory is diffracted to provide a plurality of read beams of substantially equal intensity for simultaneously scanning all of the data tracks of a selected data channel with a different one of the read beams, whereby each of the read beams is optically modulated in accordance with the data recorded on a respective one of the data tracks. The optically modulated read beams are applied to respective detectors, whereby the data recorded on the different data tracks is simultaneously converted into corresponding video electrical signals. Those signals, are, in turn, output selectively or in parallel.

BRIEF DESCRIPTION OF THE DRAWINGS

Still further objects and advantages of this invention will become apparent when the following detailed description is read in conjunction with the attached drawings, in which:

FIG. 6A illustrates a comparator circuit for generating a radial tracking error signal in response to video signals supplied by the detector array of FIG. 5;

FIG. 6B illustrates the error signal supplied by the comparator of FIG. 6A as a function of the radial tracking error;

FIGS. 7A, 7B and 7C illustrates the positioning of the clock pulse read beam and of the radial tracking beams relative to the clock pulses on a servo/clock track when the beams are offset by a positive tracking error, on-track, and offset by a negative tracking error, respectively;

DETAILED DESCRIPTION OF THE ILLUSTRATED EMBODIMENT

While the invention is described in some detail hereinbelow with specific reference to a single illustrated embodiment, it is to be understood that there is no desire to limit it to that embodiment. On the contrary, the intent is to cover all modifications, alternatives and equivalents falling within the spirit and scope of the invention as defined by the appended claims.

Figure 1:
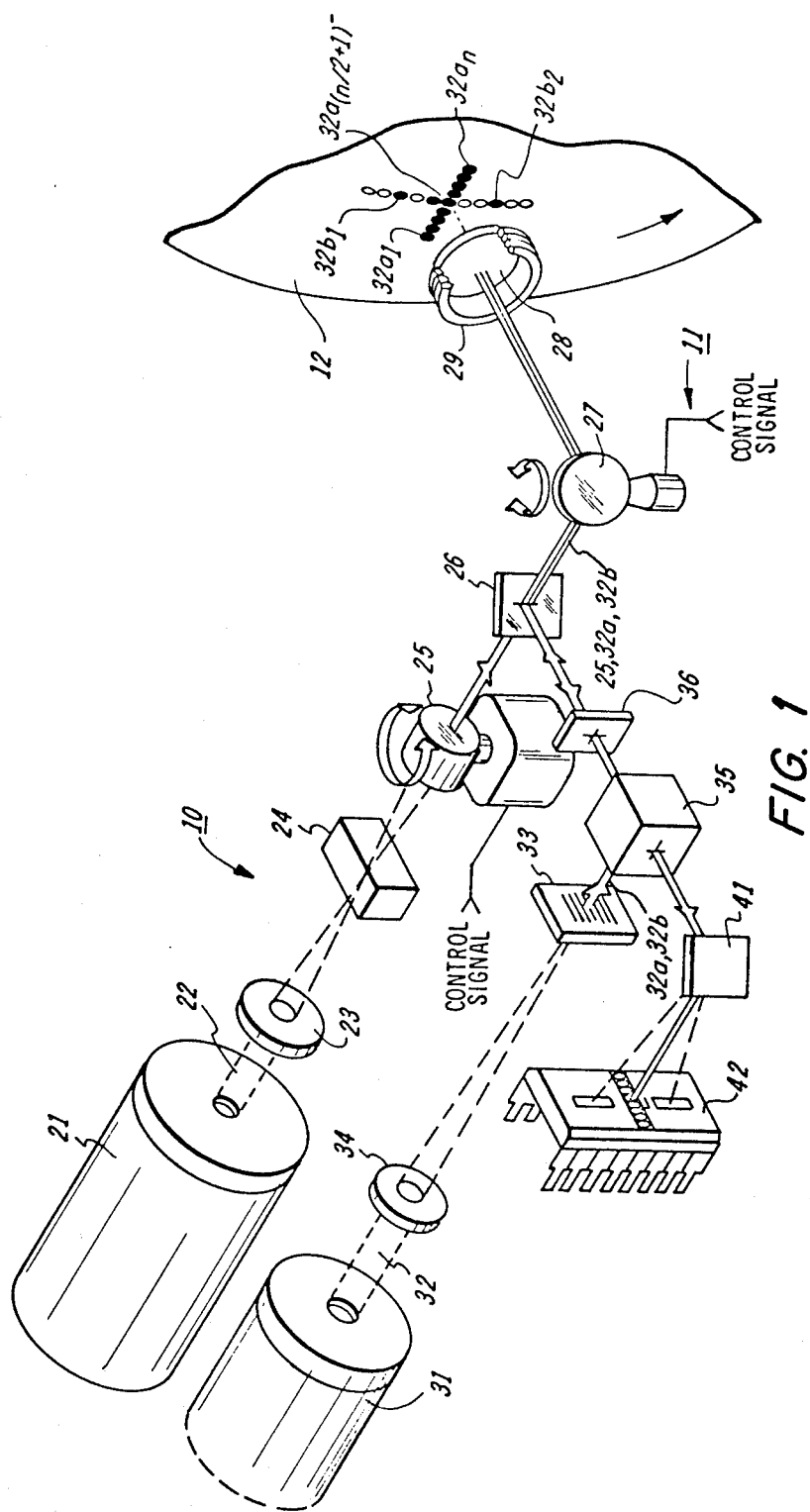
FIG. 1 is a schematic diagram of a direct read after write digital optical disk drive embodying the present invention.

Turning now to the drawings, and at this point especially to FIG. 1, there is a direct read after write optical recorder or disk drive 10 having a read/write head 11 for optically recording digital data on and retrieving digital data from a threshold sensitive recording medium 12. Typically, the recording medium 12 is a removable disk which is rotated (by means not shown) during operation at an essentially constant angular velocity in the direction of the arrow relative to the read/write head 11.

Figure 2:
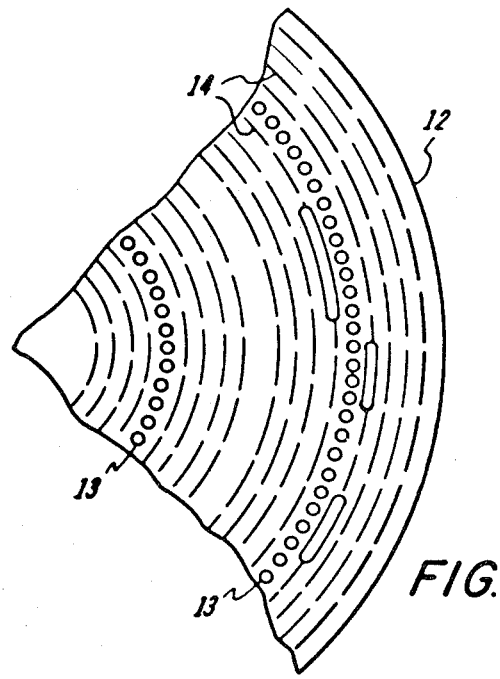
FIG. 2 is a fragmentary plan view of an optical disk which has been initialized to have one or more servo/clock tracks which are straddled by data tracks in accordance with this invention.
Figure 3:
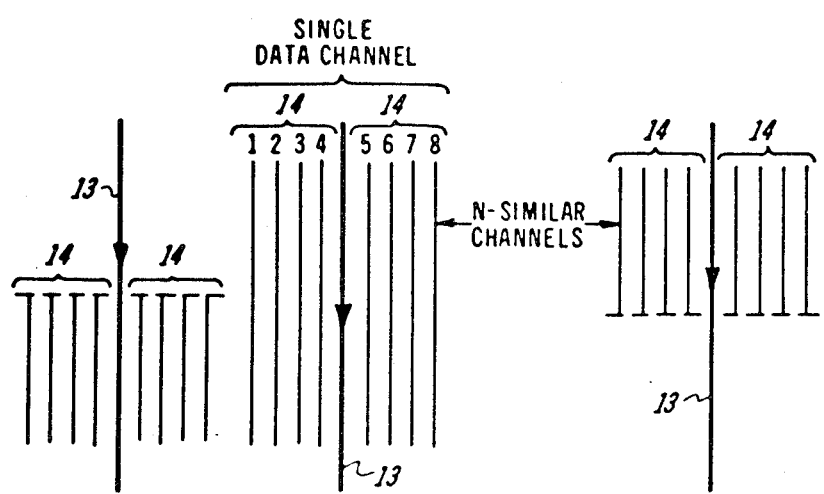
FIG. 3 is a more detailed diagram of a typical format for the servo/clock and data tracks of the disk shown in FIG. 2.

Referring for a moment to FIGS. 2 and 3, each recording disk 12 is initialized to have one or more servo tracks 13 for controlling the radial positioning of the read/write head 11 during writing and reading. If the objective is to provide random access to relatively short digital data streams, there preferably are a plurality of concentric servo tracks 13. On the other hand, if longer digital data streams are to be accomodated, a single servo track 13 having a continuous spiral configuration is preferred. In any event, the servo track pitch is selected so that each servo track 13 is straddled by a predetermined number of data tracks 14. For example, as illustrated in FIG. 3, the disk 12 is initialized to have a plurality of concentric servo tracks 13 with a pitch of approximately 20 μm. That provides space to either side of each servo track 13 for four (4) concentric data tracks 14 having a pitch of 2 μm or so, while still leaving a guard band of about 4 μm between each adjacent set of data tracks 14 (i.e., adjacent data channels) as a tolerance allowance for errors in positioning the servo tracks 13 and the data tracks 14. Of course, if tight tolerances can be maintained over the positioning of the servo tracks 13 during the initialization of the disk 12, the guard bands may be reduced or even eliminated in the interest of providing further space on the disk 12 for additional data tracks 14. As will be evident, the above-described format may also be used for a disk having a single spirally configured servo track, except that such a disk is limited to a single data channel composed of continuous, spirally configured data tracks.

Returning to FIG. 1, to record digital data on any given data track 14 of the disk 12, the read/write head 11 comprises a relatively high power laser 21 which is selectively energized for recording to supply a coherent write light beam 22. A relay lens 23 focuses the write beam 22 into an acousto-optic modulator 24, and an acoustic wave which is modulated in accordance with the digital data to be recorded is launched into the modulator 24 to intensity modulate the write beam 22. The intensity modulated write beam 22 is first transmitted through a refractive galvanometer 25 and then through a dichroic beam splitter 26 where it is combined with read beams 32a and 32b. The combined beams 22, 32a and 32b are subsequently reflected by a reflective galvanometer 27 to an objective lens 28. In keeping with accepted practices, the objective lens 28 is moved back and forth relative to the disk 12 by a servo controlled voice coil 29 so that the beams 22, 32a and 32b are focused on the disk 12.

As described in more detail hereinbelow, the reflective galvanometer 27 references the read/write head 11 to the servo tracks 13 of a preselected data channel. Thus, a control signal is applied to the refractive galvanometer 25, thereby causing it to rotate in a clockwise or counterclockwise direction, as indicated by the arrow, to independently align the write beam 22 with any given one of the data tracks 14 of the selected data channel. Accordingly, the intensity modulated write beam 22 serially alters the optical properties of the disk 12 lengthwise of the given data track 14 in accordance with the digital data which is to be recorded.

To retrieve previously recorded data from the disk 12 and to provide radial tracking and focus control while data is being recorded or retrieved, the read/write head 11 also includes a relatively low power laser 31 for supplying a coherent light beam 32 which is focused onto a two dimensional holographic diffraction grating 33 by a relay lens 34. The grating 33 diffracts the beam 32 to provide a plurality of essentially equal intensity and equidistantly spaced apart read beams $32a_1 \ldots 32a_n$ (collectively referred to herein by the general designator 32a) and a pair of essentially equal intensity radial tracking and focus control beams $32b_1$ and $32b_2$ (collectively referred to by the general designator 32b). Typically, the grating 33 is produced using the pulse width modulation technique for fabricating a two dimensional holographic grating as described in Lee, "High Efficiency Multiple Beam Gratings", presented at the Optical Data Symposium, Society of Photographic Scientists and Engineers, Jan. 23-26, 1979 (*Applied Optics*), which is hereby incorporated by reference. As will be seen, the diffracted beams 32a and 32b are refracted by a polarizing beam splitter 35 to a quarter (¼) wavelength plate 36 which, in turn, transmits them to the dichroic beam splitter 26. The lasers 21 and 31 are selected to have significantly different output wavelengths. Hence, the beam splitter 26 reflects the diffracted beams 32a and 32b for application to the disk 12 via the galvanometer 27 and the objective lens 28 as previously described.

Figure 4:
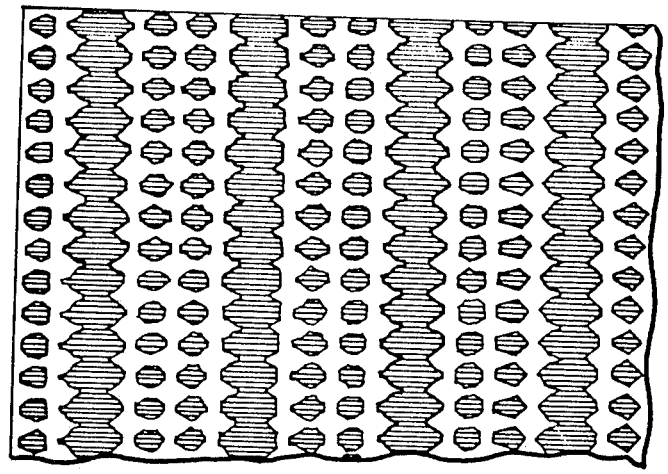
FIG. 4 illustrates a suitable profile for the diffraction grating of the disk drive shown in FIG. 1.

In accordance with this invention, the read beams $32a_1 \ldots 32a_n$ optically read out the servo track 13 and all of the data tracks 14 of any selected data channel in parallel. In other words, one of the read beams-namely, the center one $32a_{(n/2+1)}$-illuminates the servo track 13 of the selected band—while the others illuminate different ones of the associated data tracks 14. To that end, the read beams $32a_1 \ldots 32a_n$ are equidistantly spaced in, say, horizontal alignment at the output of the grating 33 so that the objective lens 28 focuses them onto the disk 12 in essentially radial alignment and on centers which are more or less equidistantly spaced by an amount selected to match the data track pitch. The radial tracking and focus control beams $32b_1$ and $32b_2$, on the other hand, are spaced above and below, respectively, the servo track or center read beam $32a_{(n/2+1)}$ at the output of the grating 33, but are tilted at a small angle (1°-3°) relative to the normal or vertical axis. Specifically, the spacing of and the tilt angle for the radial tracking and focus control beams $32b_1$ and $32b_2$ are selected so that the objective lens 28 focuses those beams onto the disk 12 above and below, respectively, the read beams $32a_1 \ldots 32a_n$ on opposite sides of but substantially tangential to a line which passes through the servo track read beam $32a_{(n/2+1)}$ tangentially relative to the disk 12. Thus, it is important that the radius of curvature of the servo tracks 13 is negligible over the arc subtended by the radial tracking and focus control beams $32a_1$ and $32b_2$, but otherwise the spacing between those beams can be selected to provide maximum sensitivity to radial tracking and focus errors. In the interest of completeness, a two dimensional diffraction grating 33 which may be used to provide diffracted read beams 32a and radial tracking and focus control beams 32b of the foregoing type for a disk 12 having eight (8) data tracks 14 per band is shown in FIG. 4. The illustrated grating was fabricated using the pulse width modulation technique described in Wai-Hon Lee's aforementioned paper.

As will be recalled, the recording disk 12 is a threshold sensitive recording medium. For example, the disk 12 suitably comprises an ablatable tellurium based, reflective film which is coated on an optically transparent substrate, such as glass or plastic. In that event, the output power of the laser 21 and the depth of modulation of the write beam 22 are selected so that the intensity of the write beam 22, as measured at the disk 12, swings above and below a predetermined ablation threshold level for the film as a function of the modulation. Consequently, as shown in FIG. 2, the write beam 22 opens small holes in the film to represent the data which is to be recorded. As will be appreciated, the write beam 22 is at least partially reflected from the disk 12, but the holes typically open quickly enough to superimpose an optical intensity modulation component on the reflected write beam 22. In contrast, the output power of the laser 31 is selected to ensure that the intensities of the read beams 32a and of the radial tracking and focus control beams 32b remain well below the ablation threshold of the film. Thus, the beams 32a and 32b do not affect the optical properties of the disk 12, but are reflected therefrom after being intensity modulated in accordance with any prerecorded information they happen to scan.

The reflected write beam 22, read beams 32a and radial tracking and focus control beams 32b pass back through the objective lens 28 and then serially reflect off the galvanometer 27 and next off the dichroic beam splitter 26. From there, the reflected beams 22, 32a and 32b are sequentially transmitted through the quarter wavelength plate 36 and then through the polarizing beam splitter 35 to a mirror 41 which, in turn, reflects the beams 22, 32a and 32b to individual detectors of a detector array 42. The quarter wavelength plate 36 and the polarizing beam splitter 35 are relied on to prevent any significant optical feedback to the laser 31 so that the reflected beams 22, 32a and 32b are efficiently transmitted to the detector array 42.

Figure 5:
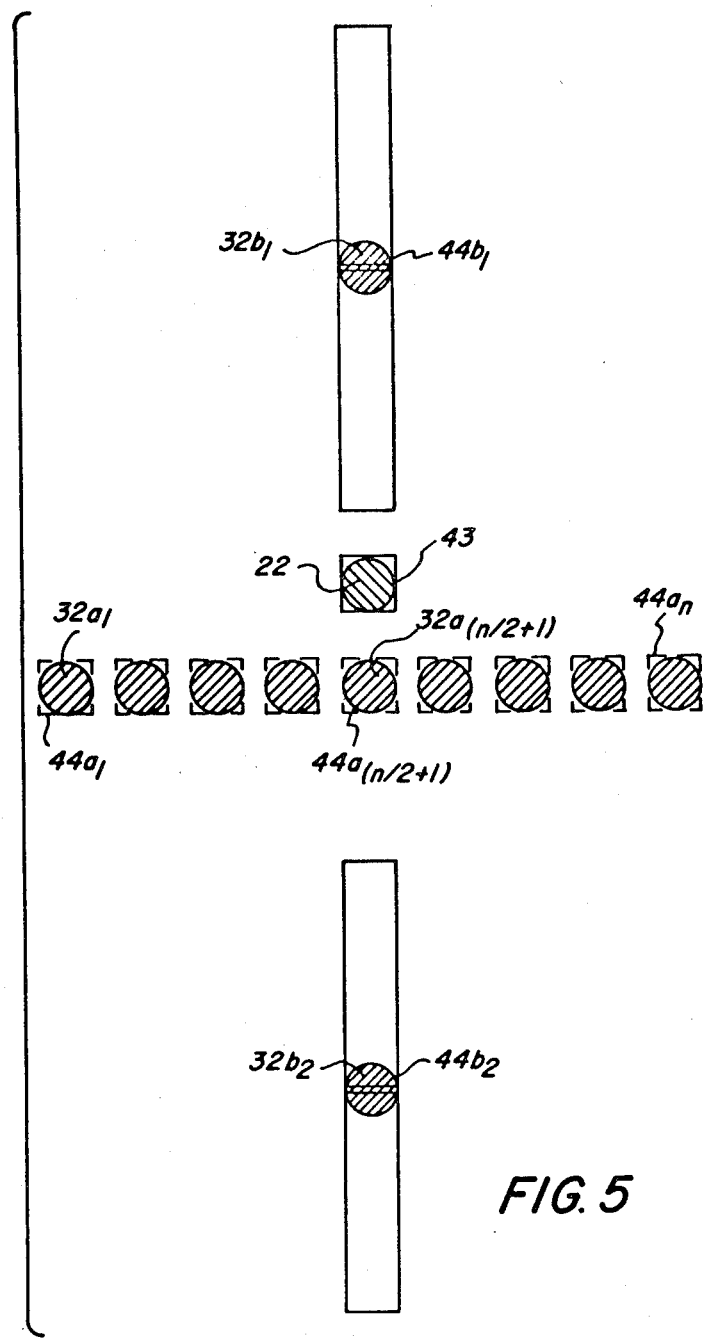
FIG. 5 is an enlarged layout diagram of the detector array shown in FIG. 1.

Referring to FIG. 5, it will be seen that the detector array 42 has individual detector elements 43, $44a_1 \ldots 44a_{n1}$ and $44b_1$ and $44b_2$ which are positioned to intercept the reflected write beam 22, read beams $32a_1 \ldots 32a_{n1}$ and radial tracking and focus control beams $32b_1$ and $32b_2$, respectively, so that those beams are converted into corresponding video signals. As illustrated in FIG. 1, the read beams $32a_1 \ldots 32a_n$ are effectively supplied by individual point sources (i.e., the diffracted output of the diffraction grating 33). It should, however, be understood that those beams could also be supplied by a common-line like source (not shown) since the segmentation of the detector elements $44a_1 \ldots 44a_n$ inherently perform a beam separation function. Indeed, the basic disdavantage of using a common-line like source for supplying the read beams $32a_1 \ldots 32a_n$ is expected to be increased crosstalk between those beams.

Advantageously, as shown in FIG. 2, periodic clock pulses are written on each of the servo tracks 13 during the initialization of the disk 12. Thus, the tracks 13 function as servo/clock tracks. As will be appreciated, the clock pulses may be pre-embossed onto the servo tracks 13 during the manufacture of the disk 12. If that technique is used, the embossing depth should be controlled to be an integer multiple of one quarter of the output wavelength of the laser 31 so that the clock pulses cause intensity modulation of the servo track read beam $32a_{(n/2+1)}$. Alternatively, the clock pulses may be ablated onto the servo track 13 through the use of a laser writing station (not shown) having independent radial positioning control means.

Turning to FIGS. 6A and 6B, once the galvanometer 27 (FIG. 1) has locked onto a servo track 13, any further radial movement of the radial tracking and focus control beams $32b_1$ and $32b_2$ will result in an imbalance in the optical modulation of those beams. Thus, the optical detector elements $44b_1$ and $44b_2$ are coupled to the inverting and non-inverting inputs, respectively, of an operational amplifier 47 to provide a corrective error signal for the galvanometer 27. Positive or negative radial tracking errors, such as shown in FIGS. 7A and 7C, respectively, which are within approximately plus or minus one half of the data track pitch of being "on track" (FIG. 7B) may be corrected in this manner, but greater errors require a coarser adjustment.

Figure 8:
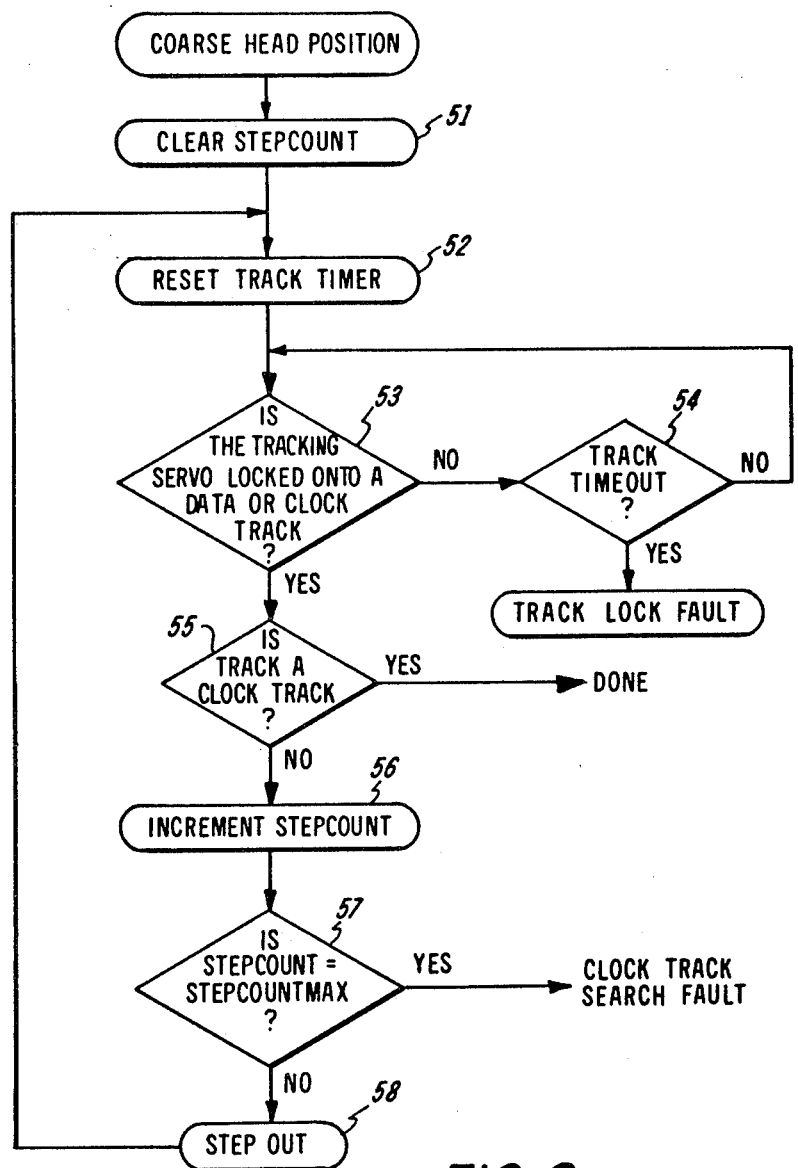
FIG. 8 is a flow diagram of a typical servo/clock track acquisition process.

Thus, as shown in FIG. 8, provision is made for seeking a servo/clock track 13 once the disk has been positioned (by means not shown) to bring such a track 13 within the field of view of the objective lens 28. This provision forms no part of the present invention and will, therefore, be discussed on a highly simplified level. Indeed, as illustrated, there is a simple routine, such as might be carried out under program control. At the outset of the routine, a step counter (not shown) is cleared, as indicated at 51, and a timer (also not shown) is reset, as indicated at 52. Thereafter, the servo track read beam detector $44a_{(n/2+1)}$ is monitored, as indicated at 53, to determine whether the servo track read beam $32a_{(n/2+1)}$ is tracking on either a servo/clock track 13 or a data track 14. The timer provides a predetermined time-out period, as indicated at 54, for the galvanometer 27 (FIG. 1) to stabilize the servo track read beam on one or another of the tracks in response to the corrective error signal supplied by the operational amplifier 47 (FIG. 6A). Once tracking is achieved, parity check or the like is performed (by means not shown) on the output of the servo track read beam detector $44a_{(n/2+1)}$ to determine, as indicated at 55, whether the read beam $32a_{(n/2+1)}$ is tracking on a servo/clock track 13 or a data track 14. For example, the clock pulses may be recorded with an even parity and data with an odd parity so that a simple parity check may be relied on to discriminate between the servo/clock tracks 13 and the data tracks 14. If it is determined that the servo track read beam $32a_{(n/2+1)}$ is tracking on a servo/clock track 13, the routine is completed and the operational amplifier 47 acquires exclusive control over the subsequent positioning of the 27. If, on the other hand, it is found that the read beam $32a_{(n/2+1)}$ is tracking on a data track 14 the step counter is incremented by one, as indicated at 56, and the accumulated count is then compared, as indicated at 51, against a predetermined maximum permissible count equal to, say, the number of data tracks 14 per band. If the maximum permissible count is reached, a fault occurs. Otherwise, a step-like increment is added, as indicated at 58, to the control signal, for the galvanometer 27 to shift the servo track read beam $32a_{(n/2+1)}$ one track to the right or left. Thus, the routine recycles to reset the timer and to then repeat the above-described steps in search of a servo/clock track 13.

Figure 9A:
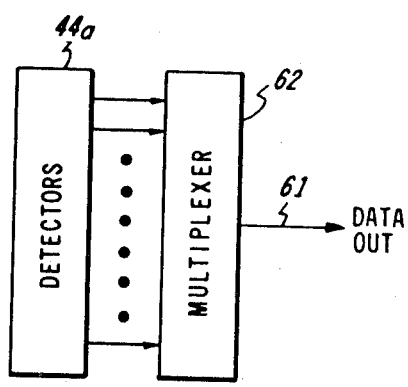
FIG. 9A is a block diagram of a multiplexer for multiplexing a plurality of parallel data channels onto a serial output line.
Figure 9B:
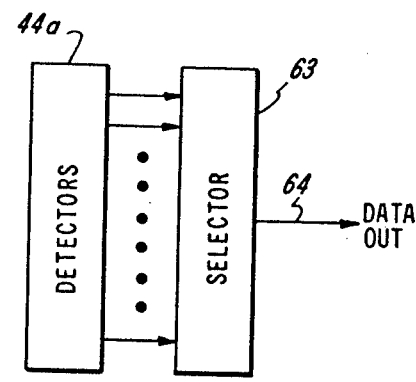
FIG. 9B is a block diagram of a channel selector for coupling a selected one of a plurality of parallel data channels to a serial output line.

Referring to FIG. 9A, the video signals supplied by the detector elements $44a_1 \ldots 44a_n$ (collectively referred to by the general designator 44a) in response to the reflected read beams $32a_1 \ldots 32a_n$, respectively, may be applied to a serial output line 61 by a multiplexer 62. If it is desired to separate, the clock frequency video from the detector $44a_{(n/2+1)}$ from video data provided by the other read beam detectors, the multiplexer 62 may be used to multiplex the video from such other detectors onto the output line 61. Alternatively, as shown in FIG. 9B, the detector elements 44a may be coupled in parallel to a channel selector 63 to selectively read out the servo/clock track 13 or any one of the data tracks 14 of a selected data channel via a serial output line 64. Still other combinations of serial and parallel read outs will, of course, be evident.

CONCLUSION

In view of the foregoing, it will now be understood that this invention provides an economical and efficient method and means for reading out the data tracks of an optical disk memory selectively or in parallel.

What is claimed is:

1. In an optical memory having a recording medium with at least one band of tracks including a plurality of data tracks, a head containing a laser for supplying a beam of coherent radiation, and a plurality of detectors for generating individual video signals in response to radiation propogated from respective ones of said data tracks; the improvement comprising a diffraction grating disposed between said laser and said recording medium for dividing said beam into a plurality of discrete read beams of substantially equal intensity, and means disposed between said diffraction grating and said recording medium for simultaneously focusing said read beams onto respective ones of said data tracks, whereby said data tracks are read out in parallel.

2. The improvement of claim 1 wherein said recording medium is a disk, and said read beams are substantially in radial alignment with respect to said disk while being focused onto said data tracks.

3. The improvement of claim 2 wherein
said optical memory is a digital optical disk memory, and
said disk is removably mounted on said drive.

4. The improvement of claim 3 wherein
said disk memory is a direct read after write optical memory
said disk comprises an ablatable reflective film coated on an optically transparent substrate, and
said film has a predetermined ablation threshold selected to prevent any significant ablation of said film by said read beams.

5. The improvement of claim 1 wherein
said recording medium has a plurality of data channels each of which contains a band of tracks including a servo track and a plurality of data tracks; and further including
means for referencing said head to the servo track of a selected one of said channels, whereby said read beams are focused on at least certain ones of the data tracks of said selected channel.

6. The improvement of claim 5 wherein
said recording medium is a disk, and
said data channels are concentric.

7. The improvement of claim 6 wherein
said memory is a direct read after write optical disk memory, and
said disk is removably mounted on said memory.

8. The improvement of claim 7 wherein
said disk comprises an ablatable reflective film coated on an optically transparent substrate, and
said film has a predetermined ablation threshold selected to prevent any significant ablation of said film by said read beams.

* * * * *